United States Patent
Moerbe

(10) Patent No.: US 9,671,225 B2
(45) Date of Patent: Jun. 6, 2017

(54) METHOD AND DEVICE FOR DETERMINING A TRANSVERSE GRADIENT OF A ROAD SURFACE ON WHICH A TWO-WHEELER TRAVELS

(71) Applicant: ROBERT BOSCH GMBH, Stuttgart (DE)

(72) Inventor: Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 14/418,867

(22) PCT Filed: Jun. 21, 2013

(86) PCT No.: PCT/EP2013/063037
§ 371 (c)(1),
(2) Date: Jan. 30, 2015

(87) PCT Pub. No.: WO2014/019769
PCT Pub. Date: Feb. 6, 2014

(65) Prior Publication Data
US 2015/0285632 A1    Oct. 8, 2015

(30) Foreign Application Priority Data

Aug. 2, 2012   (DE) .................. 10 2012 213 688

(51) Int. Cl.
*G01M 17/02*   (2006.01)
*G01C 9/10*   (2006.01)
(Continued)

(52) U.S. Cl.
CPC .............. *G01C 9/10* (2013.01); *B60W 40/06* (2013.01); *G01M 17/0076* (2013.01);
(Continued)

(58) Field of Classification Search
None
See application file for complete search history.

(56) References Cited

U.S. PATENT DOCUMENTS

| 6,718,248 B2 | 4/2004 | Lu et al. |
| 2002/0010537 A1* | 1/2002 | Yamaguchi ............. B60T 8/172 |
| | | 701/80 |

(Continued)

FOREIGN PATENT DOCUMENTS

| DE | 10 2007 061 114 | 6/2009 |
| DE | 10 2008 043794 | 5/2010 |

(Continued)

OTHER PUBLICATIONS

SMA Solar Technology AG: PV-Rectifier SUNNY BOY 3000TL/4000TL/5000TL installation instructions. Niestetal, 2009. URL:http://gerenda-solar. de/download/mounting instructions %20SMA%20SB%203000%20%204000%20-%205000%20TL. pdf (requested Oct. 9, 2012), pp. 1-76.

(Continued)

*Primary Examiner* — Andre Allen
(74) *Attorney, Agent, or Firm* — Norton Rose Fulbright US LLP; Gerard Messina

(57) ABSTRACT

A method for determining a transverse gradient of a road surface, on which a two-wheeler travels, the two-wheeler having at least one wheel, whose rolling circumference changes as a function of an inclination of the two-wheeler relative to the road surface, an inclination of the two-wheeler relative to the road surface being determined from a variable, which depends on the rolling circumference of the at least one wheel, and the transverse gradient of the road surface being determined from the tilt of the two-wheeler (Continued)

and the inclination relative to the road surface. A corresponding device and a computer program product are also described.

13 Claims, 3 Drawing Sheets

(51) Int. Cl.
*G01M 17/007* (2006.01)
*B60W 40/06* (2012.01)

(52) U.S. Cl.
CPC ........ *G01M 17/02* (2013.01); *B60W 2300/36* (2013.01); *B60W 2520/18* (2013.01); *B60W 2520/28* (2013.01); *B60Y 2200/12* (2013.01)

(56) References Cited

U.S. PATENT DOCUMENTS

| | | | |
|---|---|---|---|
| 2008/0082246 | A1 | 4/2008 | Brown et al. |
| 2015/0073744 | A1* | 3/2015 | Herrera ............... B60W 40/076 702/141 |

FOREIGN PATENT DOCUMENTS

| | | |
|---|---|---|
| DE | 10 2011 076 640 | 3/2012 |
| EP | 0 370 469 | 5/1990 |
| EP | 2 105 856 | 9/2009 |
| EP | 2 127 989 | 12/2009 |
| EP | 2 333 658 | 6/2011 |
| JP | 09-072730 A | 3/1997 |
| JP | 11-023264 A | 1/1999 |
| JP | 2010-012903 A | 1/2010 |
| WO | WO 2010/091444 | 8/2010 |

OTHER PUBLICATIONS

TripleLynx Installation handbook firm address of Danfoss Solar Inverter A/S, Ulsnaes 1 DK-6300 Graaten, Rev. date 2011-11101, URL. http//www- damfpss-cp,/NR/rdonlyres/A75905D1-4905-48D3-93A8-029FCE2DDD0/0/Danfoss LXInstallationManualDEL0041030907_03.pdf (requested Oct. 17, 2012); pp. 1-33.
Markvart, T. et al.,"Grid-connected Systems", Part IIIc, Fundamentals and Applications, 2003, Elsevier Advanced Technology, U.K. XP002713481, pp. 636-678.
Markvart, T. et al.,"Balance of System Components", Part IIIb, Fundamentals and Applications, 2003, Elsevier Advanced Technology, U.K. XP002713482, pp. 566-631.
Vittore Cossalter et al.: "Steady Turning of Two-Wheeled Vehicles", Vehicle System Dynamics, Swets & Zeitlinger BV, NL, vol. 31, No. 3, Dec. 31, 1999, pp. 157-181, XP002692787, ISSN: 0042-3114, DOI : 10.1076/VESD.31.3.157.2013 Retrieved from the Internet : URL :http://www.dinamoto.it/dinamoto/7_MDRF_papers/_MDRG%20Papers%20in^ 20PDF%20format/1999_11%20Steady%20Turning%20of%20Two-Wheeled%20Vehicles_VSD.pdf [retrieved on Feb. 25, 2013] p. 158.

\* cited by examiner

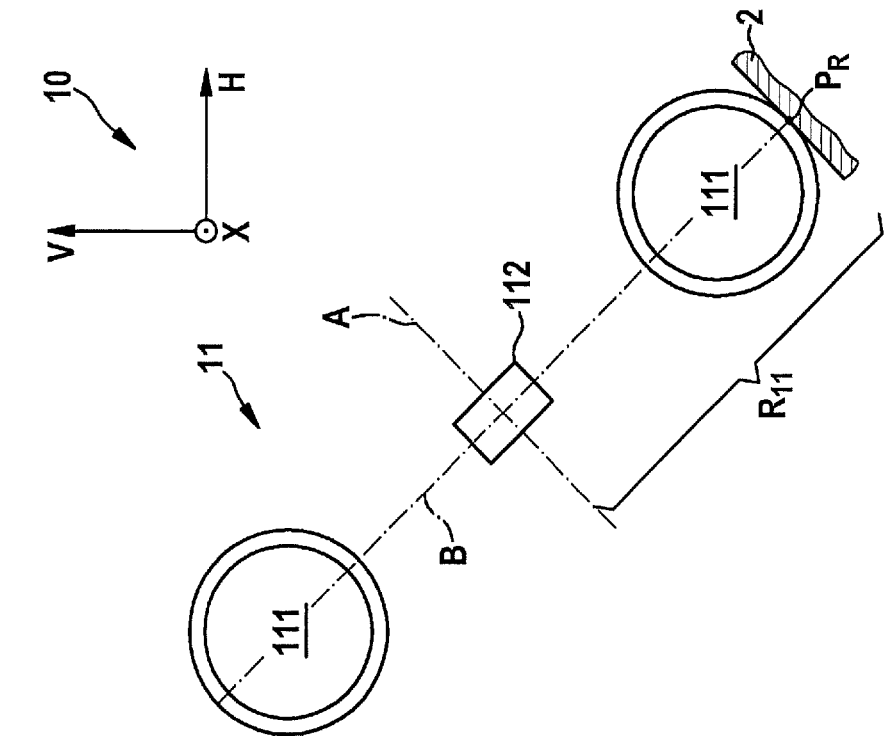
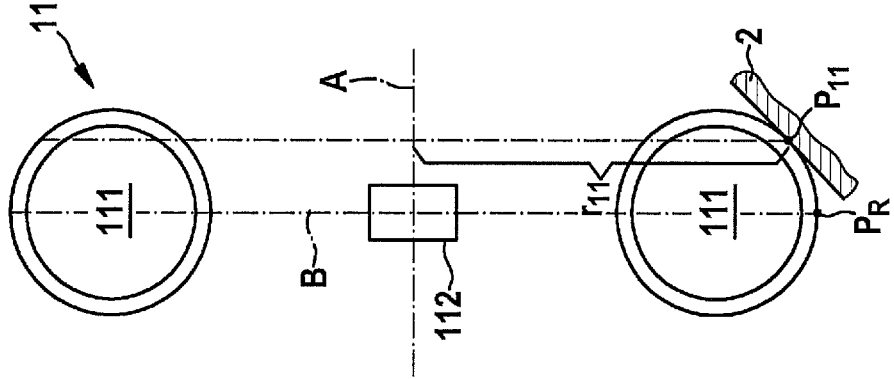
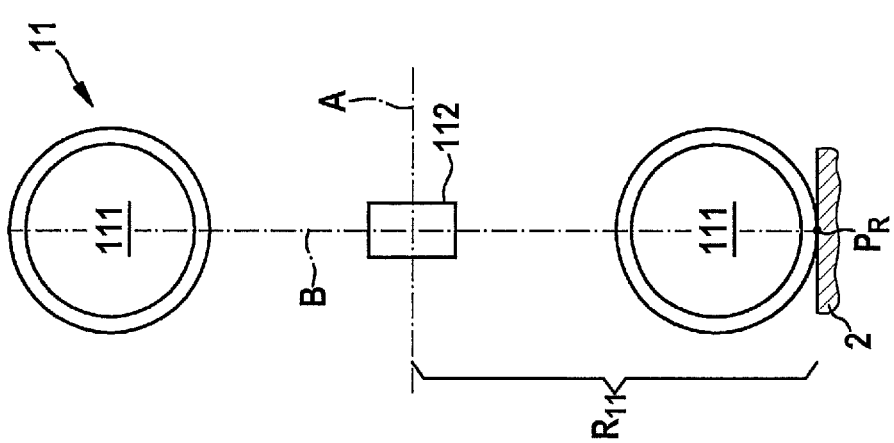

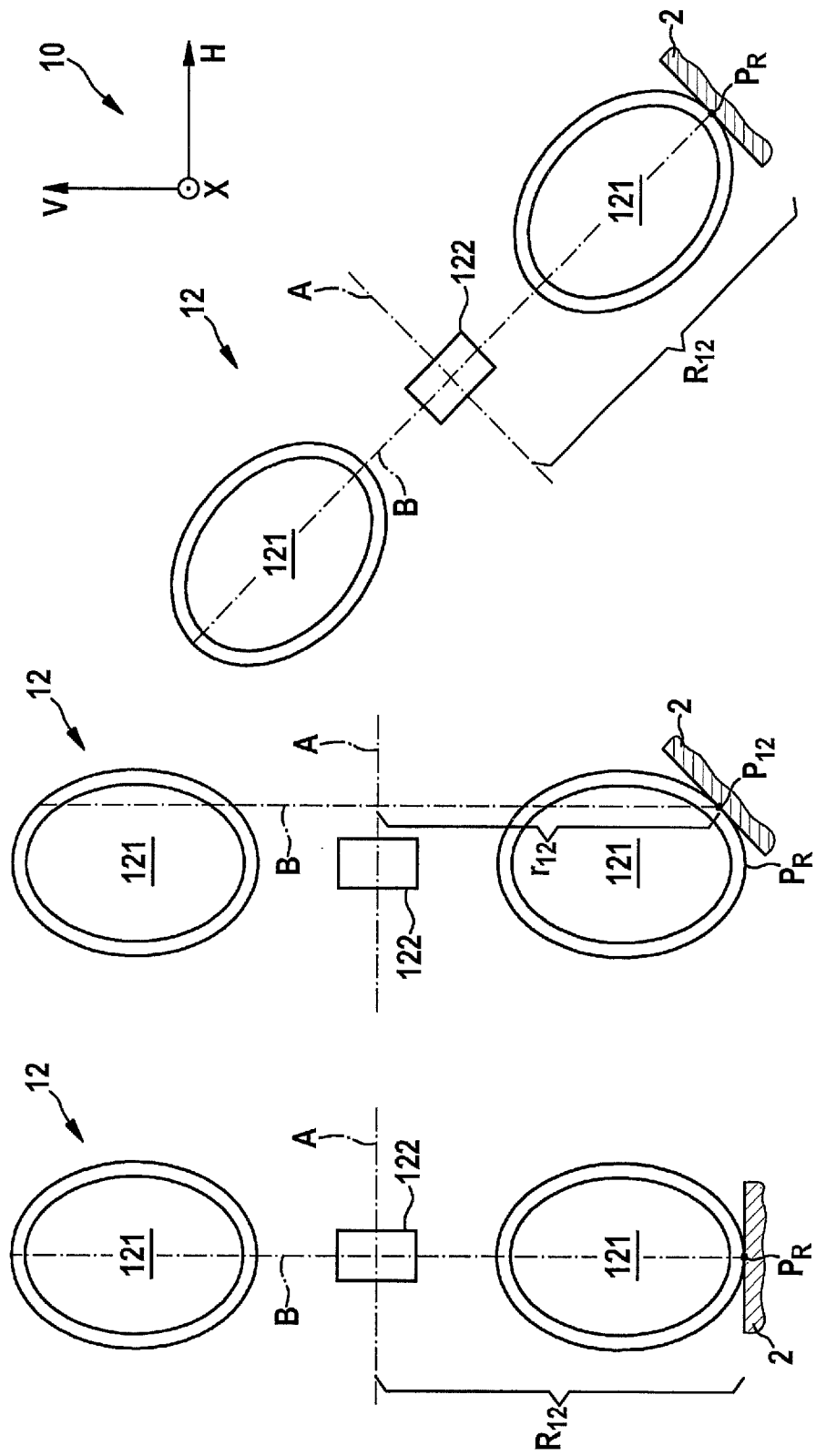

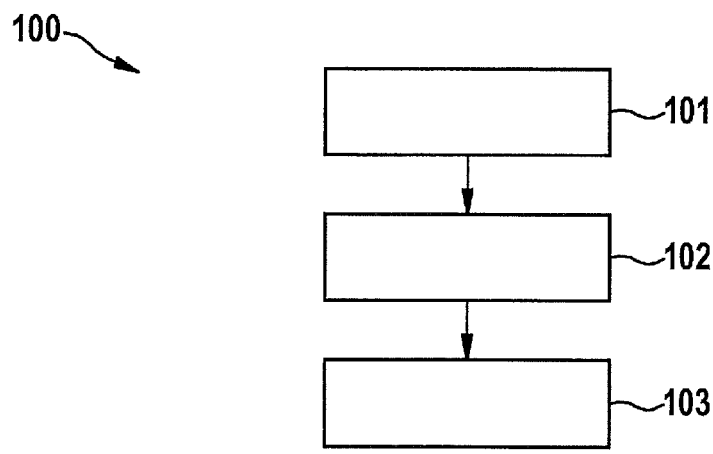
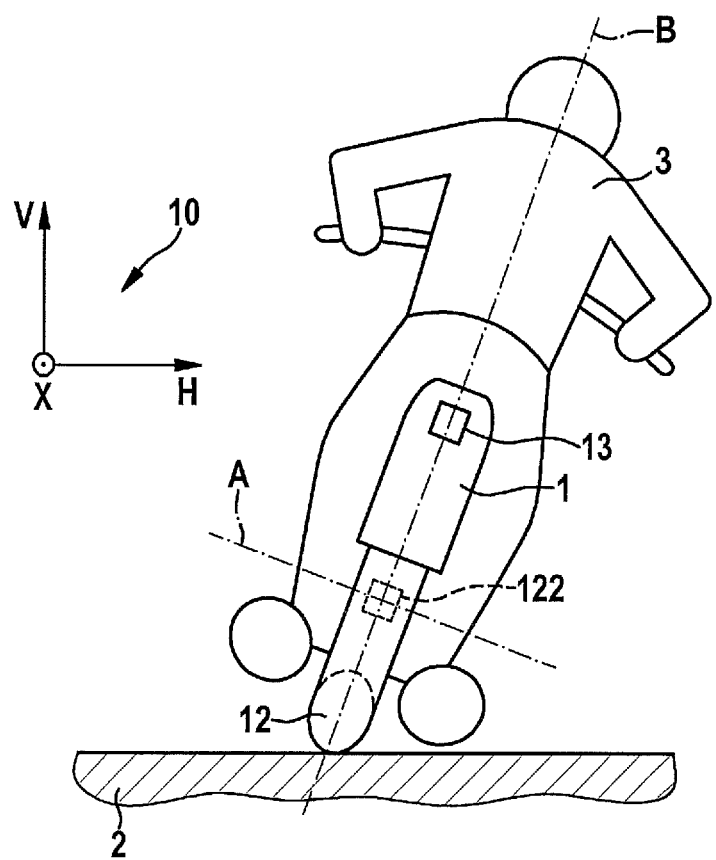
Fig. 3
Fig. 4

METHOD AND DEVICE FOR DETERMINING A TRANSVERSE GRADIENT OF A ROAD SURFACE ON WHICH A TWO-WHEELER TRAVELS

FIELD OF THE INVENTION

The present invention relates to a method and a device for determining a transverse gradient of a road surface on which a two-wheeler travels and a corresponding computer program product.

BACKGROUND INFORMATION

The term "transverse gradient" (also known as a "cross slope" in Switzerland) in highway and roadway construction refers to the inclination of the road surface (or a layer beneath same) in a direction at a right angle to the axis of the road.

Transverse gradient q is usually given in percentage. For example, a 1% transverse gradient corresponds to a height difference of 1 cm per 1 m. The main purpose of a transverse gradient is the rapid and harmless runoff of surface water to protect the body of the road from moisture and to prevent accumulations of water and the consequences thereof (aquaplaning, formation of a spray mist or black ice). However, the transverse gradient also fulfills the purposes of driving dynamics, such as absorbing, i.e., reducing the centrifugal force when driving fast through curves, for example. The transverse gradient also provides visual guidance for the driver, thereby improving perception of the curve.

Modern antilock braking systems (ABS) and integral braking systems on two-wheelers are well-developed and reliable in so-called straight-ahead braking actions and braking actions at a moderate tilt. At a greater tilt, the parameters of the braking system (for example, braking force distribution, brake pressure gradient and control strategy) must be adapted while negotiating a curve in order to ensure safe braking again in this situation. Knowledge of the tilt of the two-wheeler is essential for this. However, adaptive headlight systems, chassis systems and vehicle dynamics control systems require at least the tilt as an input variable.

A braking action while negotiating a curve results in a two-wheeler in a steering torque in the direction of the inside of the curve due to the geometric conditions. This steering torque creates a so-called righting moment. To at least diminish this, therefore, steering assistance systems may be provided to exert a steering momentum on the steering as a function of the braking intensity. The steering momentum is directed toward the outside of the curve. it counteracts the righting moment. Here again, at least the tilt must be known.

As indicated in DE 10 2007 061 114 A1 and DE 10 2011 076 640 A1, for example, the tilt may be ascertained using a tilt sensor. However, known tilt sensors measure the tilt of a two-wheeler only relative to the horizontal or vertical. However, the transverse gradient of the road surface is not taken into account.

However, the inclination of the two-wheeler relative to the road surface is also crucial for the transferable force during acceleration or braking. For example, it is possible to accelerate more in a curve, which is inclined more in the direction of the inside of the curve, than in a curve whose transverse gradient is directed less outwardly or not at all.

There is therefore a need for improvements taking into account the transverse gradient in the aforementioned application cases involving two-wheelers.

SUMMARY OF THE INVENTION

Against this background, the present invention relates to a method and a device for determining a transverse gradient of a road surface on which a two-wheeler travels and a corresponding computer program product having the features described herein. Particular embodiments are the subject matter of the further disclosures of the following description.

An aspect on which the present invention is based is to use a relationship between a rolling circumference of at least one wheel of the two-wheeler and/or a variable depending thereon, for example, the rolling circumference or the wheel speed, and an inclination to the respective road surface traveled on to determine this inclination. In combination with a tilt determined by a tilt sensor, for example, the transverse gradient of the road surface may be ascertained from this by calculation, for example.

Within the context of the present patent application, "tilt" denotes the inclination of the two-wheeler relative to the horizontal. Therefore, this is a variable which is independent of the transverse gradient. An "inclination relative to the road surface" denotes the position of the two-wheeler relative to the road surface. The two-wheeler itself and/or the road surface may have a tilt, i.e., a transverse gradient. For example, if the two-wheeler itself does not have a tilt but the road surface has a transverse gradient or vice-versa, then there is an inclination relative to the road surface. However, if both the two-wheeler and the road surface have an accordant tilt or a transverse gradient(for example, 10° or 22%), then the two-wheeler does not have an inclination relative to the road surface.

As shown by the accompanying drawings in particular, a single method alone is not sufficient to determine the transverse gradient.

Thus, as mentioned previously, other tilt sensors measure only the tilt of the two-wheeler, i.e., an inclination relative to the horizontal or vertical, generally relative to the gravitational field of the earth. For example, multiple acceleration sensors may be used here. A tilt may also be detected with the aid of known yaw rate sensors, which have been used in vehicle dynamics control systems for passenger vehicles for some time now. However, the transverse gradient is also not taken into account here.

An inclination of a two-wheeler relative to the road surface may otherwise be determined by using sensors, for example, which are mounted at certain positions on the vehicle and determine the tilt by using triangulation methods, for example. Distances of vehicle components from the road surface which vary at different inclinations may be measured with the aid of sensors. The sensors may include, for example, ultrasonic sensors, microwave sensors, radar sensors, lidar sensors, laser sensors or optical sensors. Apart from the fact that these sensors are generally expensive and susceptible to problems, they still do not allow determination of tilt in the above sense.

The present invention, however, describes a simple and reliable method, which is based on a known relationship between the rolling circumference of at least one wheel of the two-wheeler and its inclination relative to the road surface. This relationship may be ascertained on the basis of a measurement of the tires generally used and/or ascertained empirically—for example, when driving on a road surface without a transverse gradient but with various tilts.

It is particularly advantageous here to use not only the rolling circumference of just one wheel but also multiple wheels. Two-wheelers are known to have tires of different contours on the front and rear wheels. As also explained in conjunction with the accompanying figures, at an inclination of the two-wheeler relative to the road surface, it happens that both wheels are running at a higher speed due to a smaller rolling circumference than would be the case without a corresponding inclination. This change is less pronounced for the front wheel than the rear wheel. Therefore, this results in varying wheel speed differences between the front and rear wheel speeds depending on the inclination. For traditional traction control methods, for example, this means that the wheel speed difference between the front wheel and the rear wheel cannot be used as a suitable control variable.

The aforementioned relationships may be expressed as follows:

$$\Delta v = F \text{ (inclination)}$$

$$\Delta v = v_v - v_H = 0 \rightarrow \text{no inclination,}$$

where $\Delta v$ indicates the wheel speed difference between the front wheel and the rear wheel, and $v_v$ and $v_H$ denote the corresponding individual wheel speeds.

In other words, this may mean that, if there is no discernible wheel speed difference between the front wheel and the rear wheel, it may be inferred that there is no inclination relative to the road surface. If a tilt is nevertheless detected by a tilt sensor in this case, then it may be assumed that the road surface itself has a transverse gradient. In intermediate states, for example, when an inclination of the two-wheeler relative to the road surface is detected simultaneously with determination of a tilt via a tilt sensor, then corresponding values may easily be offset against one another. In particular a difference indicating directly a transverse gradient of the road surface is formed here. For example, if the wheel speed difference is greater than would result from the contour of the tire and the tilt, then the road is inclined toward the outside of the curve. In the opposite case, the road is elevated toward the outside.

A reference value may be determined advantageously from the rolling circumference or the wheel speed of at least one wheel. This may be accomplished particularly from the rolling circumferences or the wheel speeds of the front and rear wheels. A greater reliability is achieved by taking into account both wheels, among other things. A direct conclusion about the inclination relative to the road surface is possible from a change in the reference value. A corresponding reference value may be learned, for example, during a drive without any tilt or inclination relative to the road surface. Statistical methods in which reference values are collected and processed in appropriate ways over a predefined period of time may particularly be used for this purpose. The aforementioned relationships may be stipulated in the form of functions or value tables, which may also be stored in a control unit, for example, for different wheel and/or tire types or tire shapes. This is advantageously the control unit, which further uses the values thereby ascertained.

The values used may be determined at least partially by taking into account changes in torque and/or changes in speed and/or other vehicle information and/or information about surroundings ascertained by sensors in particular. It is possible in this way to compensate at least partially or to correct for negative effects, which have an influence on these values but are not based directly on an inclination relative to the road surface and/or a tilt.

The transverse gradient determined may advantageously be taken into account in regulation or control in an electronic braking system, in a headlight control system and/or in a vehicle dynamics control system and/or in the adaptation of a tire pressure monitoring system. It is particularly advantageous to take this information into account in an antilock braking system and/or in electronic braking force distribution.

One particular advantage of the present invention lies in the inexpensive implementation of the method according to the present invention and the device according to the present invention. Since antilock braking systems are also prevalent in the field of two-wheelers which monitor the rotational movement of the individual wheels with the aid of wheel speed sensors, the information required to determine the inclination relative to the road surface is already available. Therefore, no additional costs are incurred for additional sensors.

All that is necessary is to determine the tilt via a corresponding tilt sensor. However, such sensors are frequently already being installed for traction control, for example.

The transverse gradient may therefore be determined without any great effort through corresponding calculations, for example, in an engine control unit or a corresponding processing unit.

Such a processing unit according to the present invention is configured to carry out a method according to the present invention, in particular in terms of the program technology.

Implementation of the method in the form of software is also advantageous since this incurs particularly low costs, in particular when an executing control unit is also being used for other tasks and is therefore present anyway. Suitable data media for supplying the computer program include in particular diskettes, hard drives, flash memories, EEPROMs, CD-ROMs, DVDs, and the like. Downloading a program via computer networks (Internet, Intranet, etc.) is also possible.

Additional advantages and embodiments of the present invention are derived from the description and the accompanying drawings.

It is understood that the features mentioned above and those yet to be discussed below may be used not only in the particular combination indicated but also in other combinations or alone without departing from the scope of the present invention.

The present invention is illustrated schematically in the drawings on the basis of one exemplary embodiment and is described in greater detail below with reference to the drawings.

BRIEF DESCRIPTION OF THE DRAWINGS

FIG. 1 shows in subfigures 1A through 1C a front wheel of a two-wheeler at different tilts, inclinations to the road surface and transverse gradients in a schematic diagram.

FIG. 2 shows in subfigures 2A through 2C a rear wheel of a two-wheeler at different tilts, inclinations to the road surface and transverse gradients in a schematic diagram.

FIG. 3 shows a method according to a particular specific embodiment of the present invention in the form of a block diagram.

FIG. 4 shows a two-wheeler in which a method according to the present invention may be implemented.

DETAILED DESCRIPTION

In subfigures 1A, 1B and 1C, FIG. 1 shows a front wheel 11 of a two-wheeler 1 in cross section in a schematic diagram and denoted by reference numeral 11 on the whole.

Tires 111 and a hub 112 of front wheel 11 are schematically illustrated. The road surface is denoted by reference numeral 2.

A coordinate system 10 is shown to illustrate the position of front wheel 11 in space. An axis H of the coordinate system denotes the horizontal (based on the gravitational field of the earth), and axis V denotes the vertical. Axis X runs at a right angle to the plane of the paper and denotes, for example, a rolling direction of front wheel 11 and thus a direction of travel of a two-wheeler or the axis of the road. An axis of rotation A of front wheel 11 lies in the plane of the paper. An axis B runs perpendicularly to axis of rotation A and is inclined relative to vertical V, depending on the tilt of front wheel 11 and thus also that of the two-wheeler.

Subfigure 1A illustrates a situation in which front wheel 11 and thus a corresponding two-wheeler is not inclined relative to road surface 2, and road surface 2 also has no transverse gradient. In other words, road surface 2 runs parallel to horizontal H, and front wheel 11 stands upright. Axis of rotation A also runs parallel to axis H, while axis B runs parallel to vertical V. A radius $R_{11}$ denotes the rolling circumference of front wheel 11. The front wheel contacts road surface 2 at a point $P_R$ corresponding to radius $R_{11}$.

Subfigure 1B illustrates a situation in which road surface 2 no longer runs parallel to horizontal H. Road surface 2 is instead inclined at a transverse slope angle of 45° here (100%), which is illustrated exaggeratedly. However, in the situation depicted here, the two-wheeler and thus front wheel 11 do not have a tilt. It is as shown in subfigure 1A. Tire 111 now contacts the road surface at a point $P_{11}$ to yield a rolling circumference $r_{11}$. This is smaller than rolling circumference $R_{11}$, as is apparent when subfigure 113 is viewed together with subfigure 1A.

If, as was the case with a single wheel, such a smaller rolling circumference is already detected, for example, via a higher rolling speed but no tilt of two-wheeler 1 is simultaneously detected, it may be assumed that a transverse gradient of road surface 2 is present but not a tilt of two-wheeler 1.

Subfigure 1C illustrates a different case. Here, front wheel 11 itself and thus the two-wheeler have a tilt, for example, a tilt of 45° to the vertical V. However, road surface 2 also has a transverse gradient of 45°. Tire 111 therefore contacts road surface 2 at point $P_R$, as in the situation depicted in subfigure 1A. Rolling circumference $R_{11}$ of wheel 11 therefore corresponds to that of subfigure 1A. Since an analysis of a rolling circumference would not reveal any difference in comparison with subfigure 1A, in this case the transverse gradient of road surface 2 may be inferred only on the basis of a tilt detected by a tilt sensor.

As mentioned previously, there may be intermediate situations between the situations depicted in subfigures 1A through 1C, in which the transverse gradient of road surface 2, however, may be calculated from the respective determined inclinations and tilts.

In accordance with subfigures 1A through 1C of FIG. 1, comparable angles of inclination and tilts of a rear wheel 12 of a two-wheeler are shown in subfigures 2A through 2C. The tires of rear wheels 12 are denoted by reference numeral 121;

a hub is denoted by reference numeral 122. Accordingly, reference notation $R_{12}$ is assigned to a maximum rolling circumference and reference notation $r_{12}$ is assigned to a smaller rolling circumference. As is also apparent here, there is a reduction in the rolling circumference at an inclination of two-wheeler 1 relative to the road surface (subfigure 2B).

As shown by a combined view of FIGS. 1 and 2, however, the rolling circumferences of front wheel 11 and of rear wheel 12 change to different extents at the same inclination (cf. subfigures 1B and 2B) because front wheel 11 and rear wheel 12 have different tire cross sections. The reduced rolling circumference of front wheel $r_{11}$ is therefore still greater than the reduced rolling circumference of rear wheel $r_{12}$.

At the same inclination relative to road surface 2, front and rear wheels 11, 12 contact road surface 2, i.e., at different positions $P_{11}$ and $P_{12}$. This results in different rolling circumferences $r_{11}$ and $r_{12}$, but rolling circumferences $P_R$ are the same. It is apparent from this that, in the absence of an inclination to road surface 2 of two-wheeler 1, no speed difference is observable between front wheel 11 and rear wheel 12. However, there is a speed difference when a corresponding inclination is present. This difference may be used according to the present invention to determine an inclination.

FIG. 3 schematically shows a method according to a particular specific embodiment of the present invention which is denoted by reference numeral 100 on the whole. This method has three main method steps 101, 102 and 103.

In a first method step 101, an inclination of two-wheeler 1 relative to a road surface 2 is determined, namely from the rolling circumferences and/or values depending thereon, as explained.

In a step 102, a tilt of two-wheeler 1 is determined. As explained, this takes place by using suitable tilt sensors, for example.

In a step 103, the transverse gradient of road surface 2 is ascertained from the inclination and the tilt.

FIG. 4 shows a two-wheeler 1, which is ridden by a rider 3 on a road surface 2. Coordinate system 10 and axes A and B correspond to those of FIGS. 1 and 2. Two-wheeler 1 is shown in a view from the rear, so that only rear wheel 12 is discernible.

Two-wheeler 1 has a tilt determination device 13, for example, having at least one acceleration sensor and/or at least one yaw rate sensor.

Road surface 2 in the diagram of FIG. 5 does not have a transverse gradient but two-wheeler 1 with its rear wheel 12 is in a tilt relative to vertical V, as may be determined by tilt determination device 13.

What is claimed is:

1. A method for controlling a two-wheeler on the basis of a transverse gradient of a road surface on which the two-wheeler travels, the method comprising:
   determining an inclination of the two-wheeler, the two-wheeler having only two wheels, each having a rolling circumference, the rolling circumference of at least one wheel of the two wheels changing as a function of an inclination of the two-wheeler relative to the road surface, relative to the road surface from a variable, which depends on the rolling circumference of the at least one wheel;
   determining a tilt of the two-wheeler;
   ascertaining the transverse gradient of the road surface from the tilt of the two-wheeler and the inclination of the two-wheeler relative to the road surface; and
   controlling, based on the ascertained transverse gradient, one of a braking system, a headlight control system, and a vehicle dynamics system of the two-wheeler.

2. The method of claim 1, wherein the inclination of the two-wheeler relative to the road surface is determined based at least partially on a comparison of the variable, which depends on the rolling circumference of the at least one wheel, with at least one reference value.

3. The method of claim 2, wherein the reference value is defined at least one of by using a learning function and by using at least one variable which describes the at least one wheel.

4. The method of claim 1, wherein at least one of the at least one wheel speed value and one variable, depending on the at least one wheel speed value, is used as the variable depending on the rolling circumference of the at least one wheel.

5. The method of claim 1, wherein the inclination of the two-wheeler relative to the road surface is determined from a variable depending on the rolling circumferences of the two wheels.

6. The method of claim 5, wherein the inclination of the two-wheeler relative to the road surface is determined from a speed difference of the two wheels.

7. The method of claim 1, wherein the tilt of the two-wheeler is determined with the aid of at least one tilt determination device.

8. The method of claim 7, wherein the at least one tilt determination device includes at least one of at least one acceleration sensor and at least one yaw rate sensor.

9. The method of claim 1, wherein the tilt is relative to a horizontal relative to a gravitational field of the earth.

10. A device for controlling a two-wheeler on the basis of a transverse gradient of a road surface on which the two-wheeler travels, comprising:
- an inclination determining arrangement to determine an inclination of the two-wheeler, the two-wheeler having only two wheels, each having a rolling circumference, the rolling circumference of at least one wheel of the two wheels changing as a function of an inclination of the two-wheeler relative to the road surface, relative to the road surface from a variable, which depends on the rolling circumference of the at least one wheel;
- a tilt determining arrangement to determine a tilt of the two-wheeler;
- a gradient ascertaining arrangement, in communication with the inclination determining arrangement and the tilt determining arrangement, to ascertain the transverse gradient of the road surface from the tilt of the two-wheeler and the inclination of the two-wheeler relative to the road surface; and
- an arrangement for controlling, based on the ascertained transverse gradient, one of a braking system, a headlight control system, and a vehicle dynamics system of the two-wheeler.

11. The device of claim 10, wherein the tilt is relative to a horizontal relative to a gravitational field of the earth.

12. A computer readable medium having a computer program, which is executable by a processor, comprising:
- a program code arrangement having program code for controlling a two-wheeler on the basis of a transverse gradient of a road surface on which the two-wheeler travels, the two-wheeler having two wheels, each having a rolling circumference, the rolling circumference of at least one wheel of the two wheels changing as a function of an inclination of the two-wheeler relative to the road surface, by performing the following:
  - determining an inclination of the two-wheeler relative to the road surface from a variable, which depends on the rolling circumference of the at least one wheel;
  - determining a tilt of the two-wheeler;
  - ascertaining the transverse gradient of the road surface from the tilt of the two-wheeler and the inclination of the two-wheeler relative to the road surface; and
  - controlling, based on the ascertained transverse gradient, one of a braking system, a headlight control system, and a vehicle dynamics system of the two-wheeler.

13. The computer readable medium of claim 12, wherein the tilt is relative to a horizontal relative to a gravitational field of the earth.

* * * * *